UNITED STATES PATENT OFFICE.

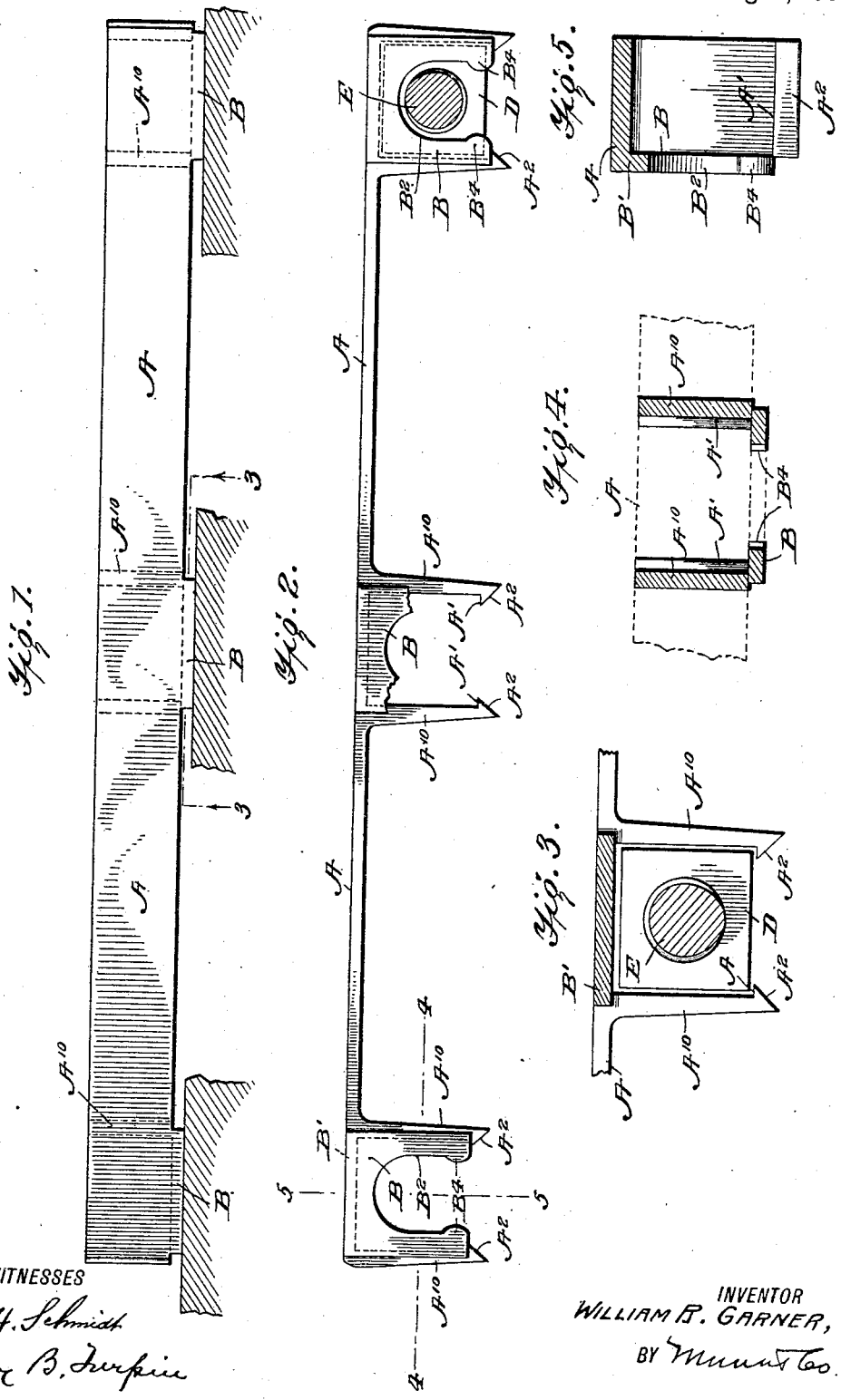

WILLIAM R. GARNER, OF PALESTINE, TEXAS, ASSIGNOR OF ONE-TWENTIETH TO HARRY C. GILCHRIST AND TWO-TENTHS TO WILLIS C. KENDALL, BOTH OF PALESTINE, TEXAS.

NUT-LOCK.

No. 930,172.  Specification of Letters Patent.  Patented Aug. 3, 1909.

Application filed December 19, 1908.  Serial No. 468,270.

*To all whom it may concern:*

Be it known that I, WILLIAM R. GARNER, a citizen of the United States, and a resident of Palestine, in the county of Anderson and State of Texas, have made certain new and useful Improvements in Nut-Locks, of which the following is a specification.

This invention is an improvement in combination nut locks and washers especially designed for use on railway rail joints, and the invention consists in certain novel constructions and combinations of parts as will be hereinafter described and claimed.

In the drawings Figure 1 is a top plan view. Fig. 2 is an elevation of the inner side of a device embodying my invention. Fig. 3 is a detail section on about line 3—3 of Fig. 1, the nut and bolt being in place, and the washer being partly broken away. Fig. 4 is a detail cross section on about line 4—4 of Fig. 2, and Fig. 5 is a cross section on about line 5—5 of Fig. 2.

In carrying out my invention I provide a body or top plate A, which may be of a width about equal to the thickness of the nuts upon which the lock is to be used, and at the inner side of this plate A I provide the depending washers B connected at their upper edges at B' with the inner edges of the plate A, being preferably integral therewith, and being cast of either malleable iron, or forged, or stamped integral with the said plate A, and the said washers B having the bolt openings $B^2$, and on opposite sides thereof the depending arms $B^3$, having at their lower ends lateral inwardly projecting extensions $B^4$ which underlie the bolt and increase the bearing between the nut and washer by these lateral extensions $B^4$ below the bolt when the locking device is applied from above. These washers, it will be noticed, in addition to serving as washers for the nuts also lock the locking device against any displacement in a direction parallel to the axis of the bolt.

The plate A is provided with the depending arms $A^{10}$, shouldered at their lower ends at A' and beveled below the shoulders at $A^2$ to facilitate the application of the arms on opposite sides of the nuts D to a position where the shoulders A' will spring beneath the nuts D and lock the device in place as against movement in a direction radial to the bolt E.

The arms $A^{10}$, when in engagement with the nut as shown in Fig. 3, prevent the turning of the nut and the accidental displacement of the locking device in a vertical direction.

In applying the locking devices it will be understood that the nuts should be loosened sufficiently to permit the driving of the washer plates B between the nuts and the back plate or angle bar. These washer plates it will be understood are attached to the top plate A at their upper ends and the shoulder springs $A^{10}$ are also attached at their upper ends to the top plate, but all are detached thence to their lower ends.

I claim—

1. A nut locking device comprising a main plate, washers integral with and projecting at a right angle to said plate from its inner edge and having a bolt opening, and arms on opposite sides thereof, and provided at their lower ends with lateral inwardly projecting portions to hook below a bolt, and arms depending from the main plate and adapted to extend on opposite sides of the nut, and provided with shoulders to spring below a nut, all substantially as and for the purposes set forth.

2. The combination in a nut lock of a main plate having depending arms to extend on opposite sides of a nut and spring operating shoulders to spring below the nut, and a double armed washer to operate in rear of a nut, substantially as set forth.

3. A nut lock comprising a plate to extend above a series of nuts, washers connected at their upper edges with the top plate at the inner edge thereof and extending down therefrom and having arms to underlie a nut and to extend on opposite sides of a bolt and provided with inwardly projecting portions to engage below a bolt, and arms depending from said top plate and adapted to extend down alongside a nut and provided at their lower ends with hooks to engage below a nut and with beveled surfaces leading thereto all substantially as and for the purposes set forth.

4. A nut lock comprising a plate to extend above a series of nuts, a washer connected with said plate and adapted to underlie a nut, and arms projecting from the said plate and adapted to extend down alongside a nut and provided with shoulders to spring underneath a nut whereby to lock the device to a nut substantially as set forth.

WILLIAM R. GARNER.

Witnesses:
W. C. KENDALL,
F. A. PATRICK.